United States Patent
Cronkright, II et al.

(10) Patent No.: US 9,881,264 B2
(45) Date of Patent: Jan. 30, 2018

(54) MOBILE SYSTEM AND METHOD FOR PROCESSING SECURE REMOTE IN PERSON TRANSACTIONS

(75) Inventors: Thomas W. Cronkright, II, Rockford, MI (US); Lawrence R. Duthler, Wyoming, MI (US)

(73) Assignee: Mobile Title Agency of Michigan, LLC, Grand Rapids, MI (US)

( * ) Notice: Subject to any disclaimer, the term of this patent is extended or adjusted under 35 U.S.C. 154(b) by 1042 days.

(21) Appl. No.: 13/216,842

(22) Filed: Aug. 24, 2011

(65) Prior Publication Data

US 2012/0030124 A1 Feb. 2, 2012

Related U.S. Application Data

(63) Continuation-in-part of application No. 11/687,464, filed on Mar. 16, 2007.

(60) Provisional application No. 60/743,541, filed on Mar. 17, 2006.

(51) Int. Cl.
  *G06Q 10/06* (2012.01)
  *G06Q 10/10* (2012.01)
  *G06Q 40/02* (2012.01)
  *G06Q 50/16* (2012.01)

(52) U.S. Cl.
  CPC ............. *G06Q 10/06* (2013.01); *G06Q 10/10* (2013.01); *G06Q 40/02* (2013.01); *G06Q 10/063* (2013.01); *G06Q 50/167* (2013.01)

(58) Field of Classification Search
  CPC ....... G06Q 10/10; G06Q 10/06; G06Q 10/063
  USPC ......................................... 705/1.1, 316, 500
  See application file for complete search history.

(56) References Cited

U.S. PATENT DOCUMENTS

| | | |
|---|---|---|
| 4,712,822 A | 12/1987 | Janos et al. |
| 5,106,141 A | 4/1992 | Mostashari |
| 5,197,774 A | 3/1993 | Diaz |
| 6,299,229 B1 | 10/2001 | Becenas Nieto |
| 7,303,226 B2 | 12/2007 | Bernstein et al. |
| 2003/0101342 A1* | 5/2003 | Hansen ................... G06F 21/35 713/167 |

(Continued)

OTHER PUBLICATIONS

Samantha Peterson, Home Loan Deals on Wheels, Jul. 9, 2004, Inman News.*

(Continued)

*Primary Examiner* — William S Brockington, III
(74) *Attorney, Agent, or Firm* — Craig A. Phillips; Dickinson Wright PLLC

(57) ABSTRACT

A mobile system and method are provided for securely sending, receiving and signing documents remote from a home office. A mobile unit capable of connecting to a home corporate network where documents are stored relating to a transaction is used as part of the system. While in route to or at the remote signing location, the mobile unit connects to the corporate network and prints the documents, or the home office sends the documents through a secure wireless connection to the mobile unit. The transaction is conducted at a remote location, and the executed documents are scanned and sent securely to the corporate network. The housing and mobile unit may be moved to a subsequent location and the mobile unit connects, while in route to or at the subsequent location, prints the documents for the subsequent transaction.

10 Claims, 4 Drawing Sheets

(56) References Cited

U.S. PATENT DOCUMENTS

2006/0164676 A1* 7/2006 Walker .................. G06F 3/1204
358/1.15

OTHER PUBLICATIONS

Sean Cutter, Viginia's Mobile Mortgage Office, Dec. 1997, State Innovations Briefs.*
Air Force One Overview, 1995-2009, Boeing Corporation.
Sean Cutter, Virginia's Mobile Mortgage Office, Dec. 1997, State Innovations Briefs.
Charles Slat, Bank Bus is Rolling Classroom, Jun. 17, 2004, Monroenews.com.
U.S. Appl. No. 11/687,464, filed Mar. 16, 2007.

* cited by examiner

MOBILE SYSTEM AND METHOD FOR PROCESSING SECURE REMOTE IN PERSON TRANSACTIONS

CROSS REFERENCE TO RELATED APPLICATION

This is a Continuation-In-Part application of U.S. application Ser. No. 11/687,464 filed Mar. 16, 2007, entitled "Mobile System And Method For Processing Real Estate Transactions" and also claims the benefit of U.S. Provisional Patent Application Ser. No. 60/743,541 filed Mar. 17, 2006, entitled "Mobile Signing Unit and Method of Delivering Remote Escrow Signing Settlement Services for the Insurance Industry."

BACKGROUND OF THE INVENTION

1. Field of the Invention

This invention relates to mobile systems and methods for remotely processing real estate transactions in real-time and secure in-person transactions that are remote or offsite from the office.

2. Description of the Prior Art

An insurance company issues insurance for real property, and sometimes for other high value assets, such as airplanes, vessels and certain vehicles. Insurance companies also provide additional real estate services, including search and examination, commitment issuance, escrow, signing, settlement, and document recordation. Most of a company's services are performed in a traditional brick-and-mortar office setting because real estate and mortgage transactions must be conducted in the presence of a company representative or notary public. As a result, buyers, sellers and their agents and representatives typically travel to the company's office to sign the papers and "close" the transaction.

In certain legal jurisdictions many other documents must also be signed in front of a notary. Most documents requiring signing in front of a notary, such as financing documents, real estate documents and other legal papers include confidential personal information. Such confidential personal information includes driver's license numbers, social security numbers, names, signatures of the parties, bank account numbers, and other information related to identity theft. Recent changes to federal and state laws place greater burdens on parties with this information to keep it secure and protected. Due to the sensitive nature of this information and these new laws, the sending and receiving of such information must be absolutely secure, especially when conducted remote from or offsite from the main or satellite offices of a company, escrow company, lender, notary service or other business, particularly if the notary is an independent contractor and not an employee of such company. For many transactions, consumers are not comfortable conducting such transactions remotely from an office setting and therefore, true mobile document signings are very rare and those that are performed are limited to a notary bringing hard copies of the documents, prepared by and picked up from a home office.

As legal compliance with new privacy and identity theft laws becomes stricter, businesses must develop methods to protect personal information from threats of identity theft and fraud. This is particularly challenging when real estate and lending transactions are involved, especially given the types of personal information used in such transactions.

Companies currently address the inability to conduct secure off-site document signings with only two methods, both of which are problematic. The first method is to prepare all necessary documents prior to the off-site signing and mail or send by delivery service the prepared documents to the parties involved. The parties involved must then sign the previously prepared documents in the presence of a public notary, either provided by the company or hired individually by the parties, and then return the signed documents to the company by mail or delivery service. Although this method is commonly used, it is very problematic in view of the exemplary problems provided in further detail below. In view of the new privacy and identity theft laws, this method may not comply with the laws and therefore, has limited future use. In addition, this first method generally does not leave a positive impression with the clients of the company.

The second method is to have the company who prepares the documents provide a public notary who picks up the documents from the offices of the company and then travels to an off-site location, witnesses the signing of the documents by the parties at such location and then returns with the signed documents to the company. The second method is also problematic as detailed below.

While an off-site signing provides convenience for the parties to the transaction, it often delays the process and increases the risk that the signing will not take place on the desired date if changes or revisions to the documents are required after the documents are prepared, taken off-site but before the signing of the documents by the parties. For example, one significant problem with providing the documents by mail or delivery service is the time required to complete the transaction after the company sends the documents, sign the documents and then return them by mail or the delivery service. While waiting for the company to review and approve the signed documents, some of the parties to the transaction may be waiting to receive significant sums of money from the transaction, or waiting for funds from the signing to become available.

Another problem with mailing the documents is that no matter how clearly the company provides instructions or labels the documents, the parties, who typically rarely participate in such transactions, may make a mistake in the documents. The mistake may be as simple as one party signing in the wrong location, a spouse not signing the documents, signing with a different or incomplete name, or not returning a complete set of signed documents to the company. Furthermore, if the documents are mailed to the parties, the parties must still schedule a time with a public notary who must witness the signing of the documents.

Another problem with documents either mailed, provided by a delivery service or brought to the signing by a public notary are revisions that are necessary at the signing, including changes to the loan amount, commission split, new negotiated terms, or any number of additional issues relating to the transaction, including mistakes by the company who prepared the documents. Changes to address such issues commonly occur or are only noticed after the company sends the documents, typically when the parties are ready to sign. A traditional off-site public notary is unable to make these changes at the signing. Most changes require new documents from the preparing company (typically necessitating special software used in the original preparation of the documents) and in many instances require new documents from the lender (which can only be made by the lender and must be re-sent to the company) and then provided again to the signing parties. Therefore, to change the documents, the parties must request new documents be mailed, or if present, the company's public notary must travel to the office to obtain the new documents and come back at a later time with the revised documents. Typically changes require rescheduling the signing or even travel by the parties to the office of the company preparing the documents. In view of the above challenges, many signings are delayed, and any delay can adversely affect transactions having specific signing deadlines.

Another challenge for off-site signings is the inability to receive and disburse secure funds at a remote location. Funds cannot be distributed to the parties at the signing until funds are received from the lender. Funds may be received via wire transfer or check. Once the funds are received and verified, the company can print, sign, and issue the checks. At an off-site signing, a public notary does not have the capability to communicate with the lender, deposit funds, change amounts, or print and sign the checks.

Because off-site public notaries do not have access to the necessary software to prepare the documents as described above and typically cannot receive new documents from the lender, the signing would be cancelled or best case, significantly delayed. In addition to causing significant inconvenience and aggravation for all parties involved in the transaction, it is also possible that a delay could affect whether the transaction ever closes. For example, failure to close a transaction as planned may result in the loss of an interest rate lock, expiration of a purchase agreement between a buyer and a seller, the inability to take advantage of tax-deferrals (such as 1031 exchanges), and increased costs relating to accrued interest and finance charges on debts to be paid at the signing. Any delay is inefficient, reduces productivity of the company, and negatively affects the reputations of the professionals involved in the transaction. Even so, many times the document must be significantly changed to account for changes on the date of signing through no fault of the company preparing the documents. Delays also increase the expense to the company and significantly reduce productivity. For example, travel to and from a signing may require several hours for the notary or signing personnel and not signing at the scheduled time may require repeating the signing in the future at the cost of several more hours.

In addition, it is difficult for companies to ensure the security of transactions if documents are left in the hands of a public notary, many times who were hired by the parties to the transaction, and not the company, or only for a single transaction. The transaction may occur in an area significantly remote from the office location and therefore not practically accessible under current methods by an employee of the company at the home office. In such instances, the company typically hires a public notary who is an independent contractor and is only used for a single transaction. While attempts are currently made to ensure the reliability and trustworthiness of employees and independent contractors who handle sensitive confidential information, so far companies have had limited success in ensuring the security of document including personal confidential information when transactions occur remote from the home office.

SUMMARY OF THE INVENTION AND ADVANTAGES

According to at least one embodiment of the invention a method for processing document signings is provided. The method includes automatically receiving and printing documents on a printer connected to a router having wireless internet access. The router connects through a wide area network, such as the Internet, to a remote network that stores the documents, preferably through a secure and encrypted internet connection. The documents are received and printed while the printer and the router are in transit to a first location, or when the printer and router are at the first location. The documents are then executed at a designated site.

According to a further aspect of the invention, a mobile system for remotely processing transactions is provided. The system includes a corporate network including electronically stored documents relating to at least a first transaction and preferably a second transaction and more preferably, subsequent transactions. A mobile signing unit is provided that includes a printer and a router having wireless internet access for securely connecting to the corporate network through a wide area network and a direct connection on a virtual private network, such that a printer in the mobile unit automatically connects to the corporate network, such as while en route to a remote location. The mobile signing unit downloads and prints the documents relating to a transaction while remote from the home office. The mobile signing unit then moves from the current location to a subsequent location. While en route to, or at either the first or second location or a subsequent location, the mobile signing unit automatically connects to the corporate network to download and print the documents relating to the second or subsequent transaction. The mobile signing unit may also include an optional computer for electronic document signing and/or magnetic check scanner.

The present invention provides for secure remote and off-site signings. The system includes a home office or corporate location with secure electronic communication capabilities with remote vehicles, generally referred to herein as mobile units. A document entry system is provided, such as a secure website through which a client may send documents to the home office, typically a server at the home office. The documents are uploaded, prepared and generally filled with information as needed. All the documents are prepared without completing the signing of the documents or completion of the transaction and generally without printing the documents to the transaction. The company may provide the mobile unit, or it may be provided by a notary. The mobile unit may be based at and travel from the home office or even be based in another state from the home office and never visit the home office. More specifically, in the present invention, the completed documents are printed directly to the mobile unit on the day of the signing, and are not physically provided directly to the notary and are not faxed to the notary.

Generally the mobile unit will include GPS device, a printer, a scanner, and a device, such as a router or wireless device with the capabilities of establishing a virtual private network ("VPN") or other secure internet connection between the home office and the mobile unit. The GPS device could be integrated into the vehicle but also could be an independent device, such as a smart-phone capable of relaying data back to headquarters, where logistics and routing software will coordinate signings. The printer and scanner must be able to connect over the encrypted VPN or similar internet connection and for security reasons have the capability to ensure all data on the network device is encrypted and not stored on any devices in the mobile unit long term, preferably not at all.

The network device when powered on, automatically connects to the home office and creates a secure, encrypted connection over which data is transmitted in the form of print jobs and scanned documents. No computer or human intervention is needed. The network device may also broadcast a secure and encrypted Wi-Fi signal to allow connectivity a certain distance from the mobile unit. The network device may be integrally configured to connect to the internet, or a separate device may be included. The connection to the internet is preferably completed through a static IP internet device, which allows a consistent structure that is used to troubleshoot and diagnose connection issues. Of course, an antenna, either integral to or separate from the network device or VPN device is provided. Preferably the antenna is a dual high-gain antennae designed to provide steady internet connectivity. Of course, the mobile unit may have a separate antenna on the outer surface of the mobile unit which allows for boosted signals.

To provide the highest level of service in an efficient manner, the home office may have logistics and routing software that is connected to a GPS device in the mobile units that will allow real-time routing, scheduling, and tracking. This software can interface with the daily schedule for each mobile unit and can accommodate last-minute additions, deletions and other changes. The software may also allow for real time tracking and real time instructions to operators through mobile devices such as cell phones or other devices. On the day of the scheduled signing, the originating office, the home office, headquarters, or corporate location may provide each client and the signers with a link that will allow the client to track in real-time the geographical location of the mobile unit assigned to conduct the signing. The system may also be configured to give only an estimated time of arrival while the mobile unit is stationary at another signing and once mobile to the subject signing provide the real-time geographical location and updated estimated arrival time to the next client. As part of the interface with the client or parties interested in the transaction, the network at the home office, headquarters, the originating office, or corporate location or a may provide certain real time updates, such as sending an e-mail, text message, automated voicemail or other electronic communication to the client upon one of the following events: (a) the arrival of the mobile unit at the desired location, such as the prescheduled signing location, (b) the status of the signing, such as completion of the signing, the documents being uploaded to the home office, or that the documents are being reviewed by corporate's quality control department remote from the mobile unit, and (c) the approval of the documents, which may also provide information how the documents will be sent or provided to each party, such as that they will be sent electronically, or the originals will be sent via overnight courier and include the tracking number on the overnight package(s).

The system and method of the present invention allows for a client or customer to enter an order into the order entry system. The order entry system may include various prompts, such as type of service, requested date, property address, signing address, name and contact info, payment info, e-mail address, the ability to create an account with a password, signing information including primary signer information and any additional signers, type of documents, number of loans and if a power of attorney is required. In some instances, the client can select a language preference or a contact person during signing. To facilitate signing, the client may upload electronic files at the initiation or before signing, or may send the documents by UPS or FedEx if desired. The client will also provide instructions where the signed documents are to be sent upon completion of the transaction. Before a transaction, the mobile signer or operator, typically a notary public, will power up systems in mobile unit, such as a vehicle. In some instances, such as for vehicles, this may be as simple as starting the vehicle and having the system in the mobile unit automatically power up, or separately power up through another switch or switches in the vehicle.

To transact a paper signing, the following steps provide a summary of the overall process. The client enters order on secure web-site, including all the desired contact and transaction information. If particular documents are to be used, the client may upload documents when an order is created, may send the documents via email, or may upload the documents to a website. For repeat customers or customers using standard forms, the customer's information and documents may reside on the company's servers allowing them to auto-populate on the next order. The desired signing time and place of signing may be provided in the order entry and confirmed later by the company or the company may subsequently contact the listed document signers to arrange signing time and schedule any appointments. The system and method is configured to allow for clients to change documents prior to signing, even after the mobile signer is en route to the remote transaction or even at the location of the remote transaction. However, immediately prior to the scheduled signing time, the transaction is "locked" on the website, prohibiting changes to the documents. Any changes to documents must be emailed or communicated to the home office, also referred to herein as corporate. It should be recognized that the term corporate may be a back office which processes and handles the transaction for the home office who is the interface corporate. Locking the documents ensures that all signers are aware of what documents are to be signed, and that none of the parties to the transaction are surprised at signing.

The individuals operating the mobile units are expected to receive a daily route for signings. This route may change during the day to accommodate last-minute signings. For example, the route may be updated to a routing or GPS device in the vehicle to take in account cancelations, scheduling changes and additional signings. It should be noted that the additional signings may be easily accommodated without the mobile unit returning to corporate headquarters or a physical office location. As the route is updated, the documents being sent to the printer may also be adjusted to match the new route. For security reasons it is preferable that the documents related to a transaction are not printed to the printer in the mobile unit until the mobile unit is activated, typically en route to the relevant location, or many times not until the mobile unit is in close proximity to the destination. Scheduling and delaying the timing of the printing of documents is also helpful for quality control to prevent documents from one transaction being mixed with another transaction and to allow for late changes to the documents. Existing systems require that the mobile operator leave the physical office with all of the documents for each file and mistakes happen, such as missed papers or papers being displaced into the wrong transaction file thereby potentially disclosing confidential information. Currently, if a document is missed or has a missing page, the signing or transaction is delayed so that the mobile signer may return to the home office to acquire the relevant document, as compared to the present invention where the change can quickly be made and the documents resent to the mobile unit.

The route may also be updated to facilitate changes in the address of the next location as well as the specific directions to that location to accommodate traffic, construction and other travel delays. Based on the selected route, the mobile unit will travel to the remote signing location. Upon arriving at the signing location (or en route), the power will have already been turned on, or will be turned on to power to the equipment in mobile unit. After the equipment is powered on, communication is wirelessly established with the corporate office, preferably automatically. Once wireless connectivity is established, specifically a VPN or similar connection, corporate will print documents directly to mobile unit, typically in order of scheduled transactions and preferably timed so only one transaction is printed before each closing. Therefore, there is no need for interaction by the operator of the mobile unit to receive documents, and the operator may direct the mobile unit to the signing location while the documents are sent and then printed for the next transaction. When the documents are finished printing, the systems in the mobile unit may automatically contact corporate to confirm there were no errors and that the complete documents were successfully received and successfully printed.

Upon arriving at the signing location, the operator will park the mobile unit in a safe location without obstructing other vehicles or traffic. All necessary safety precautions should be used, including use of flashers, if appropriate. The operator generally will lock the mobile unit upon leaving it, but typically will leave equipment powered on to avoid power-up delays after signing. After obtaining the documents from the mobile unit, the operator may, before leaving the mobile unit, or after leaving the mobile unit, complete any additional organization of the documents, such as neatly stacking and clipping the individual documents. Of course, it is expected that the documents will be printed in a format and order to facilitate any additional organization of the signing documents by the operator.

At the location, the operator or mobile operator will greet the signors with an appropriate introduction while presenting a credibility piece and possibly a business card. The credibility piece may be picture identification, such as a driver's license or corporate ID card. To ensure security, corporate may previously provide to the people at the signing the identity of the mobile operator or operator, such as in the email sent regarding expected arrival time. As an introduction, the mobile operator could greet the parties at the signing as such, "Good morning, my name is [Name] and I am a certified notary with [Company]. I will be conducting your signing today."

During the signing, the mobile operator or operator will verify the identification of the signers prior to conducting the signing. The signing of the necessary documents will proceed in accordance with relevant regulations, or for example, in accordance with corporate's procedures, and any applicable rules, regulations or standards, such as industry standards. After the documents are signed, the operator will return to the mobile unit to make copies. Once back at the mobile unit, the notary will scan the entire signed document package which is preferably automatically sent back to corporate. For example, the documents may be scanned and directly emailed to the corporate office for a quality control review. Any copies of the signed documents are then made. To improve efficiency, the operator may make the copies while waiting for final quality control from corporate, but of course could wait until after receiving approval from corporate of the signed documents. After the documents have been transmitted to corporate, the operator may contact corporate to confirm receipt. Corporate then may conduct an immediate or subsequent quality control of the signed documents upon receiving the electronic copies or upon verifying receipt with the operator. The operator may return to the signers and present a copy of the documents, but typically may not leave the signing location until corporate contacts the mobile operator to confirm there were no problems and approves the documents. Of course, the operator may wait for confirmation before returning to the signing individuals to present them with their final copies of the transaction. To maintain security and reduce the potential for errors, the operator would preferably package any documents that need to be overnighted to corporate in the overnight envelope at that time. Of course the overnight envelope may be configured to receive documents for more than one transaction and could be sent after the conclusion of several transactions. Any documents, not overnighted to corporate or the client, are shredded or otherwise destroyed onsite. The documents in the overnight package are then dropped in the nearest overnight drop box. The operator, also known as the mobile signer, or notary would then proceed to next signing as above and follow the above described method.

While the above method specifically details the steps of conducting a mobile signing with a mobile vehicle for a paper signing, the method may be varied to incorporate or allow for electronic signing of documents with procedures meeting the minimum standards set by various state and federal laws as well as various organizations or regulations depending on the type of transaction. The method is very similar to above, with a few differences as summarized below. Again, the transaction starts with a client entering an order on secure web-site. The client may upload documents when the order is created or may send the documents via email or may later upload the documents to the system.

While the client may specify a time in the order entry screen for the appointment, corporate may also contact the signers to finalize the signing time and schedule appointments. When entering the order, the customer or client may upload documents, but of course, the documents for signing may change between the time the order is entered and the date of the signing. Immediately prior to the scheduled signing time, that transaction is "locked" on the website, prohibiting changes to the documents. While before the documents are locked, the parties may have access to change the documents in some circumstance after the documents are locked, any changes to documents must be emailed or communicated to corporate, so that corporate may ensure all parties are aware of and agree to the suggested changes. On the scheduled day of signing, the operator will as above proceed en route to the signing location, which is remote from corporate, and may even do many weeks worth of transactions without ever visiting any physical corporate locations, such as a home or satellite office. As above, the mobile operator may receive a daily route for signings that may change to accommodate any desired variance and to maximize efficiency, timing, and schedules.

For a signing involving electronic signatures, the mobile unit upon arrival at the signing location (or en route), may have power turned on to the various equipment described as being within the mobile unit. As stated above, the power up stage may occur initially once in the morning, or each time the mobile unit is moved between locations. With the equipment powered on, the equipment communicates with corporate a ready status that allows it to receive the desired documents electronically. Once the equipment is connected, a secure link to open the documents electronically may be sent to the mobile unit or in some cases, directly to the parties or a designated party. As these are electronic documents, the documents will not be sent to the printer, but instead an electronic link or an electronic copy of the documents will be provided to the mobile unit. For example, the operator once in the signing or before the signing, may connect a computer (or it could be connected automatically during the power up discussed above) to the internet using an encrypted Wi-Fi signal that is broadcasted from the mobile unit. Once connected, the operator will open the documents electronically via the secure link provided by corporate. The operator will present the electronic documents to the signers and obtain digital signatures. This may require the use of a stylus and screen that captures the actual signature electronically that complies with the Electronic Signature Act in lieu of a typeset signature. The electronic documents are then sent back to corporate for a quality control check. After the electronic documents have been transmitted to corporate, the operator may contact corporate to confirm receipt, or receive an automatic e-mail reply that the documents have been received. Corporate will finalize the quality control and either approve or reject the signed documents. If the signers request a hard copy of the signed documents, the operator then prints to the printer in the mobile unit or corporate sends a copy of the signed documents to the mobile unit for printing. The operator then presents the requested hard copies of the signed documents to the signers. Of course, the presentation of any hard copies may occur after approval by corporate. As with above, it is also preferable that any hard copies not provided to the clients or overnighted to corporate are shredded onsite before leaving the location and proceeding to next signing as above. Of course, in the event any document in the electronic documents requires a traditional "wet" signature, the mobile operator must follow the paper signing procedures set forth above for such documents or a combination of steps from both procedures.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a system and method for processing real estate transactions is provided. An exemplary housing 20 depicted in FIG. 1 includes the components needed to close real estate purchase and re-finance transactions, or other transactions remotely, in real-time, including the components of a mobile signing unit 24 consistent with the present invention.

Figure 1:
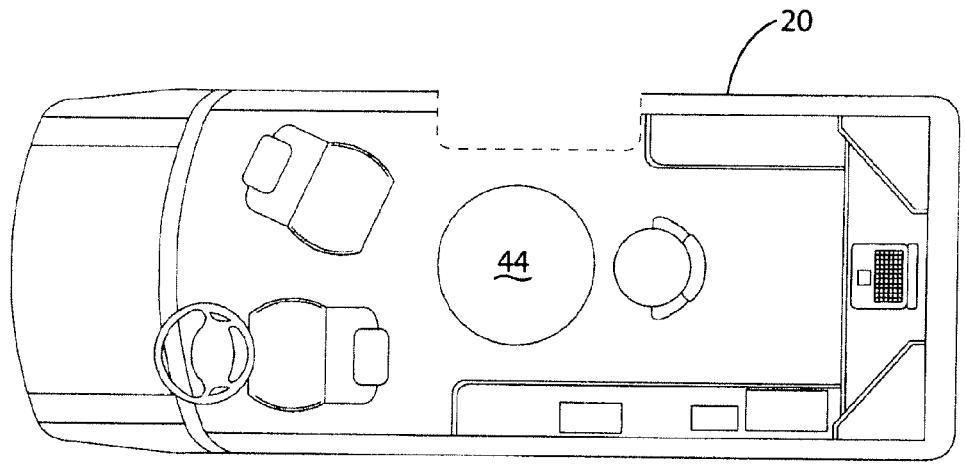
FIG. 1 depicts an overhead interior view of the mobile signing unit in an exemplary van.

The housing 20 is illustrated in FIG. 1 as a vehicle, specifically a van. While the Figures illustrate the housing 20 as a van, the housing 20 may be any vehicle or method of transportation capable of movement and having sufficient space to accommodate the necessary components of the mobile signing unit 24. Exemplary housings could include an airplane, helicopter, boat, automobile, truck, recreational vehicle or trailer, so long as the unit is easily moveable between signing sites. More specifically, the housing 20 is any mobile vehicle capable of accommodating the components of a mobile signing unit 24, including one or more devices capable of printing, faxing, scanning, and copying documents, connecting to a remote corporate network 36 and/or a financial institution 60 in real-time to receive documents, transmitting in real-time executed documents back to the corporate network 36, and receiving, depositing and disbursing funds, may be used.

Figure 2:
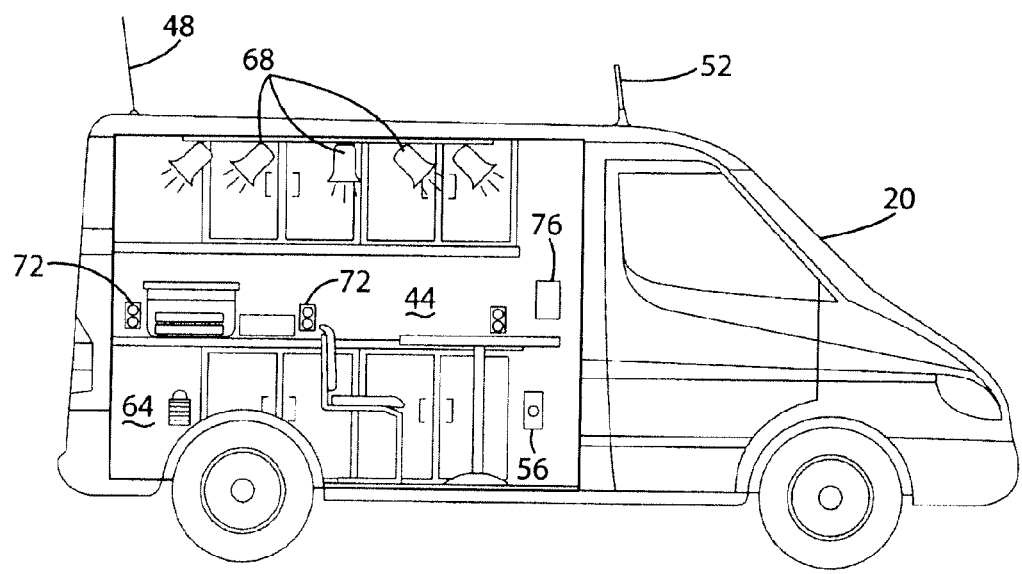
FIG. 2 depicts a side interior view of the mobile signing unit in an exemplary van.

The housing 20 may further include optional items, in addition to the mobile signing unit 24 to facilitate the productivity of the user. As illustrated in FIGS. 1 and 2, the housing 20 may include an optional work surface area 44, chairs, a table, and cabinets. These optional items may be useful in signing a transaction, such as a real estate transaction that occurs offsite at a vacant parcel of land where other facilities may not be available. The housing 20 in some embodiments may include items to facilitate signing of transactions, including real estate transactions, in inclimate weather or after a disaster when limited facilities are available for signing a transaction. For example, the housing may be sued to process insurance documents on a remote basis. Even if the work surface and chairs are not used by the parties during the transaction, they still may be useful to the user and facilitate the process of assembling, preparing, or modifying documents. The housing 20 optionally includes a secure storage area 64 to store checks and other important documents pertaining to a transaction.

To further facilitate the productivity of the user, the housing 20 may include lighting 68 and electrical outlets 72. The housing 20 includes a power supply (not shown), such as the alternator of the vehicle, batteries, a separate generator, solar panels, or other power sources (individually or in conjunction). Depending on the vehicle acting as the housing 20, the housing 20 may further include a power converter (not shown) that converts the direct current, such as the 12V systems common for vehicles, to alternating current common for most electronics, such as printers or scanners. The power supply and power converter are sized to provide sufficient power to all of the components included in the mobile signing unit 24. A heavy duty power system that includes an upgraded alternator or a second alternator may be beneficial to providing the necessary power to the power converter. In the preferred embodiment, if the vehicle power supply is a 12V system, the power converter converts the power to 120V alternating current, which is provided to the electrical outlets 72. Of course, if a separate generator is used, such as those commonly used in recreational vehicles, the need for a power converter is eliminated. Providing current and voltage similar to that commonly used in office settings allows the use of standard office equipment in the housing 20, as part of the mobile signing unit 24 and therefore reduces the cost of the mobile signing unit 24, and allows for easy replacement of any components of the mobile signing unit 24.

To facilitate ease of use, the housing 20 may include a power switch 76 that controls power to the mobile signing unit 24. While the components included in the housing 20 and the mobile signing unit 24 itself may be powered by being directly or hard wired into the vehicle's power supply, or more typically through for the wall plugs, the power switch 76 may act as a master switch. Where the housing 20 includes a power converter, the power switch 76 may simply turn the power converter on and off. For example, when the power converter is on, the power and lights of the mobile signing unit 24 are on, and vice versa.

The mobile signing unit 24 allows a user to receive signing documents remotely, make changes to the signing documents, send and receive transmissions to a company and a lender, deposit funds directly into the company's bank account, and securely disburse money to the parties. The mobile signing unit 24 when used with real estate transactions generally includes a printer 28, a router 40 having a wireless internet card, an antenna 48, an optional stand-alone magnetic check scanner 80, and an optional computer 32. The printer 28, optional magnetic check scanner 80, and an optional computer 32 are connected to the corporate network 36 through the network router 40 and the antenna 48 using a wireless Internet connection.

While any antenna 48 or antenna configuration may be used that allows connection either directly or indirectly to the corporate network 36, the antenna is typically attached to the housing 20. For example, as illustrated in FIG. 2, the housing 20 includes a high-gain external antenna 48 mounted on its exterior to establish a wireless connection to wide area networks. The housing 20 could alternatively include a wireless cellular antenna 52 mounted to its exterior, and include a cellular antenna interior connection 56, to establish a wireless connection to wide area networks. The mobile signing unit 24 may also include a satellite/wireless antenna 48. The wireless antenna 48 indicates a generic wireless transmission that is capable of receiving and transmitting data from and to, respectively, an corporate network 36. For example, because cellular signals may not be available in all locations, a satellite communication system that allows sending of data between the mobile signing unit 24 and an corporate network 36 may be used. In some embodiments, as illustrated in FIG. 2, the housing 20 may include multiple antennas to ensure that no matter the location connection may be made through the most reliable method. However, as satellite internet connections are still expensive, the system may be configured to default to the least expensive method of communication that provides a reliable signal. In some embodiments, the antenna 48 may even allow connection to Wi-Fi and WiMax or other methods of connecting to the corporate network.

When the mobile signing unit 24 is powered on (typically through the power switch 76), it automatically connects to the corporate network 36 using a secure, encrypted internet connection. Upon connection, the company can transmit signing documents directly to the mobile signing unit 24. While the mobile signing unit 24 is powered off, documents are stored electronically for delivery to the mobile signing unit 24 when it is subsequently powered on. Documents can be transmitted to and printed by the mobile signing unit 24 while it is stationary or in motion.

The router 40 may include a wireless card 84, such as an Evolution Data Optimized ("EVDO") card, or a card configured to use some other third-party wireless internet transmission protocol. This wireless card 84 may act as the antenna 48. A specialized EVDO routing device will provide dynamic DNS services to alert the corporate network 36 as to the location of the mobile signing unit 24. The router 40 includes separate, direct wired connections to the printer 28 and the computer 32. This allows high-speed printing, faxing, and scanning jobs to be sent from the corporate network 36 directly to the printer 28 included in the mobile signing unit 24 and vise-a-versa. When the power switch 76 is turned on, the router 40 uses the wireless card 84 to automatically connect to the corporate network 36 through the Internet 100. The router 40 remains connected to the Internet 100 and the corporate network 36 until it is powered off, even when the mobile signing unit 24 is moving. Of course, one skilled in the art will recognize that an external mounted antenna 48 may provide a more reliable signal.

The printer 28 may be any multi-functional printing device capable of printing, scanning, faxing, and copying documents. The functions performed by the printer 28 could optionally be performed by separate devices for photocopying, printing documents and/or checks, faxing, and scanning. Of course, one benefit of using a multi-function printer is the space saved over using individual components. One skilled in the art will appreciate that the hardware components of the mobile signing unit 24 must be compatible with one another and collectively perform the processing described hereinbelow. For example, a sophisticated router 40 can direct print jobs to multiple devices and print checks on blank check stock via a magnetic printing device and print other documents on a traditional laser printing device. A router 40 with less functionality, however, may only be capable of printing data received from the corporate network 36 via a single port and thus limited to printing to a single multi-function printing device.

When the printer 28 is turned on, such as by the master switch 76, it automatically connects to the corporate network 36 through the router 40 also can be known herein as a network device if it is configured to create a secure link to the home office. Once connected to the corporate network 36, the printer 28 will automatically receive and print pending and new print jobs sent from the corporate network 36. An employee working at the corporate network 36 can send a job to the printer 28 located in the mobile signing unit 24 in the same way that print jobs are sent to printers physically residing in the employee's office. The jobs can be sent to the multi-function printer 28 even when the mobile signing unit 24 system is powered off or in transit. If the printer 28 is not connected to the network, when the mobile signing unit 24 and printer 28 are powered on, the pending job will automatically be recognized by the printer 28 and printed. Otherwise, the print job will wait in the queue until the printer 28 reconnects to the network. If the mobile signing unit 24 is connected to the corporate network 36, the print job will be printed irrespective whether the vehicle is in motion or stationary.

The printer 28 and the computer 32 operate independently. The computer 32 does not have to be turned on, or even connected to the mobile signing unit 24, for the printer 28 to receive and send documents to and from the corporate network 36.

The computer 32 may be any laptop tablet or desktop computing device, useful for electronic signatures. A docking station may be used to facilitate connecting a laptop to the wireless network. In the event a laptop is used, an additional hard-wired connection may be made between the router 40 and a docking station mounted to the inside of the housing 20 that supports the laptop, thereby providing hard-line access to the internet and applications and services residing on the corporate network 36. In addition, a secure 802.11 Wi-Fi connection secured with medium access control ("MAC") level security for that specific laptop will be provided so as to enable wireless communication with the laptop remote from the mobile unit. A network interface included in the computer device 32 or router 40 may also facilitate transmission of data within the mobile signing unit 24 and between the mobile signing unit 24 and the corporate network 36. Of course, any other method of connection may be used, including, satellite, and any method of accessing the internet or corporate network 36.

When the computer 32 is turned on, it can access the internet through the router 40. Once connected to the internet, the computer 32 can then connect to the corporate network 36 and access the software, files, databases, etc. as if the computer 32 were connected to the corporate network 36 locally. The computer 32 can send documents to the multi-function printer 28 included in the mobile signing unit 24, or to a remote printer 28 located, for example, in the office.

Figure 3:
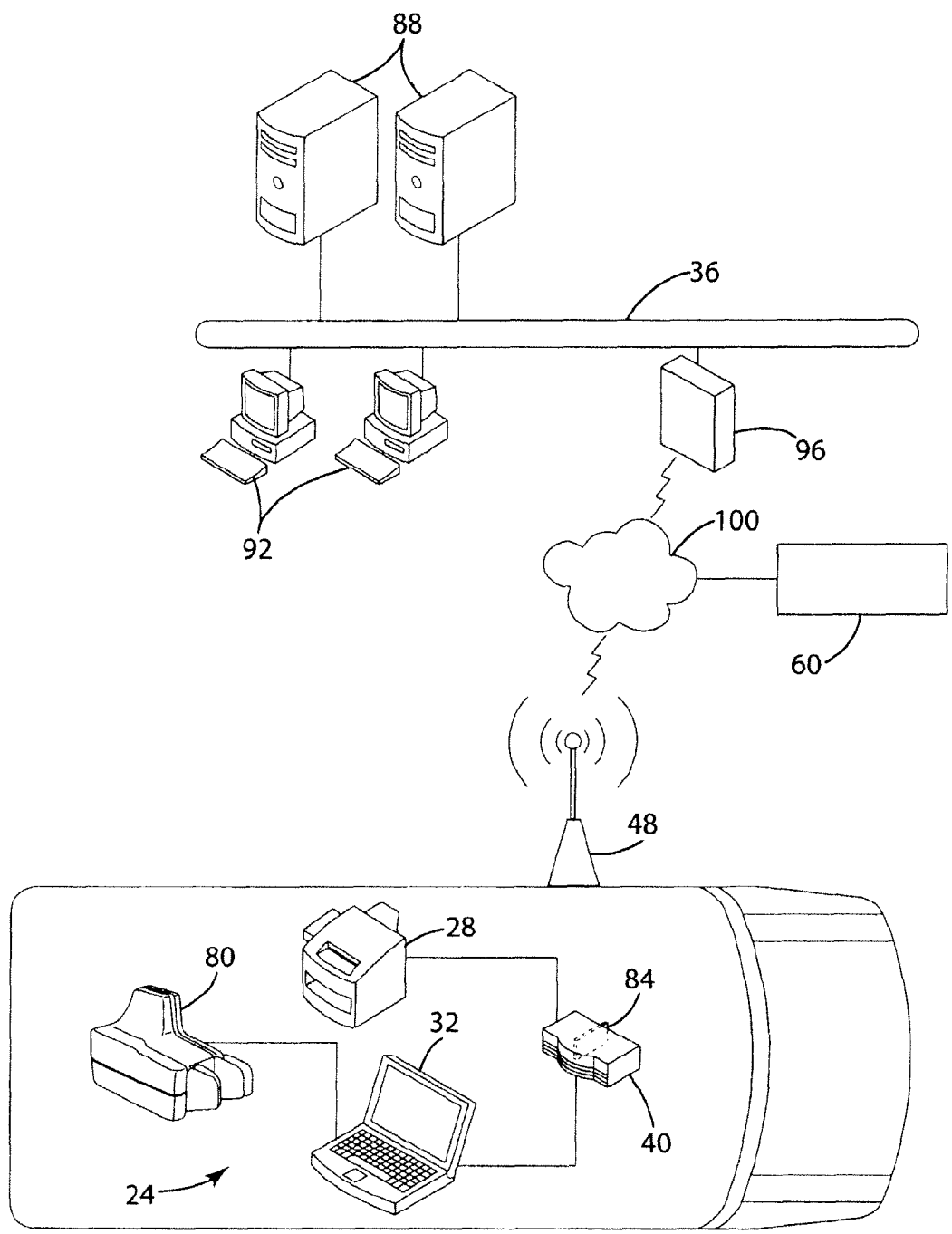
FIG. 3 depicts an exemplary network configuration that may be used to implement the present invention.

Referring to FIG. 3, a representative system architecture is provided. The corporate network 36 includes one or more terminal and application servers 88, and one or more workstations 92 connected to a local area network. The local corporate network 36 connects through a firewall 96 to a wide area network 100, such as the internet. The workstations 92 have access to software that is used to generate documents relating to real estate transactions. The documents may include, for example, signing documents (including checks), lender signing documents, and shipping labels. The corporate network 36 and mobile signing unit 24 can also connect to a financial institution 60 via the wide area network 100.

A typical transaction using the mobile signing unit 24 includes transmitting and printing documents (including checks and overnight delivery labels), verifying lender funds, depositing funds into the company's bank account, disbursing checks to the parties, electronically transmitting the documents to the company and the lender, copying the signing documents, and, if necessary, making changes to signing documents through the use of specialized software and receiving new documents from the lender. After signing a transaction, the mobile signing unit 24 is moved to the next signing location and is capable of receiving and printing the next documents en route.

Figure 4A:
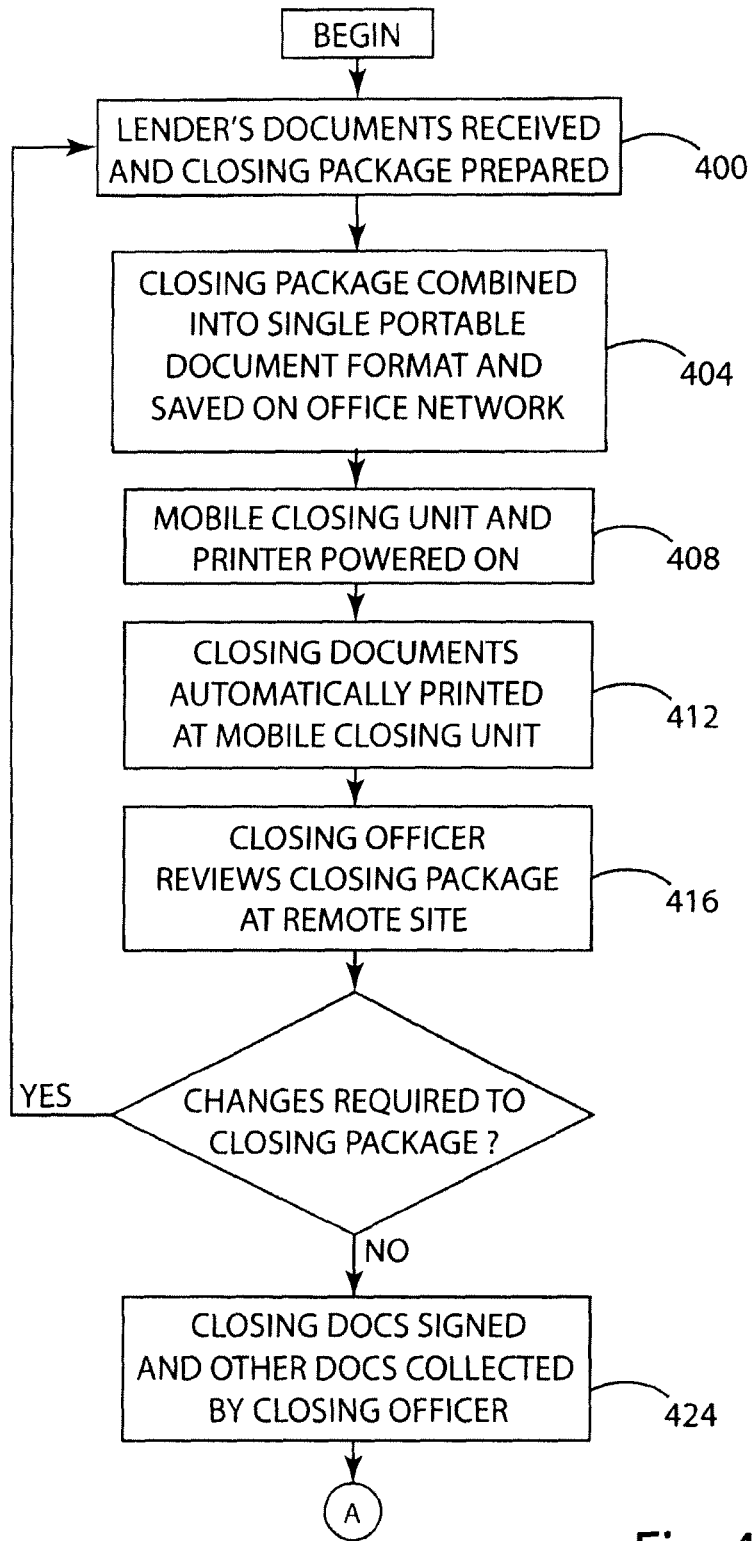
FIGS. 4a and 4b depict a flow diagram for processing a real estate purchase transaction.
Figure 4B:
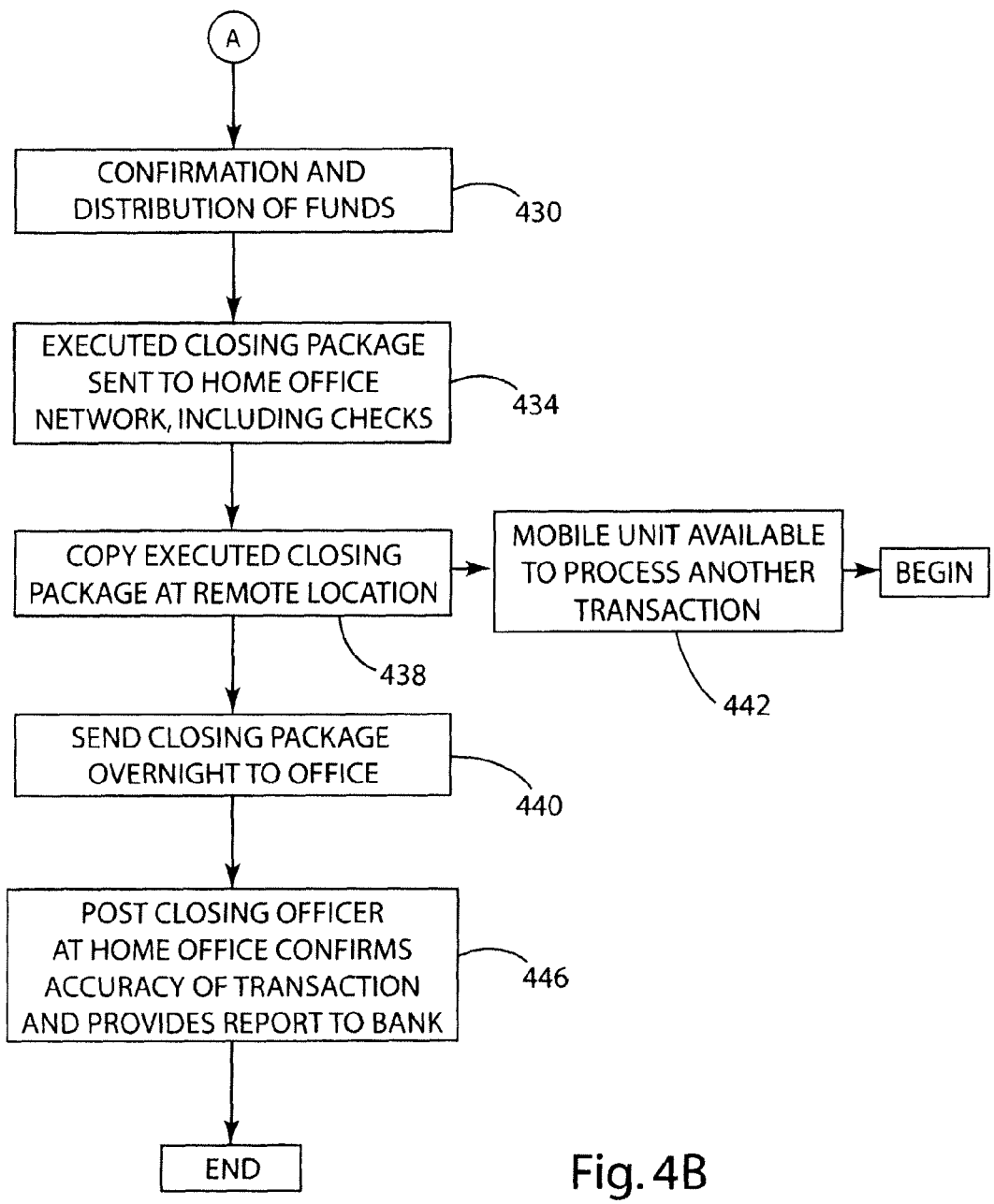

FIGS. 4*a* and 4*b* depict the steps performed in a real estate purchase transaction consistent with the system and method provided by the present invention. An escrow officer, at the office, receives lender signing documents and prepares a documents for a real estate purchase or re-finance transaction [400]. The documents includes, for example, signing documents, lender signing documents, labels, and checks. The documents are assembled into a single portable document format, such as Adobe, and saved on the corporate network 36 [404]. When the escrow officer, typically located at the office, has completed assembly of the signing documents, the escrow officer sends the documents from the corporate network 36 over the wide area network 100, through the firewall 96, to the printer 28 in the mobile signing unit 24.

When mobile signing unit 24 and the printer 28 are powered on [408], the printer 28 automatically receives and prints the documents(s) that were sent to it by the escrow officer, including any pending documents in the print queue [412]. This may occur while the mobile signing unit 24 is en route to, or after it has arrived at, the designated location. The location could be the property for which the signing is occurring, a third-party business, or any other location agreed upon by the parties.

The signing officer, mobile operator or mobile signer, reviews the signing documents at the remote location [416]. If updates were sent from the office, the signing officer may replace pages of the original documents requiring modification as appropriate.

If changes need to be made to any of the signing documents, the escrow officer can make the changes on the corporate network 36 and send them to the printer 28 included in the mobile signing unit 24. For example, changes may be received by the escrow officer from the lender, one of the parties, or upon request of the signing officer at the signing. If the mobile signing unit 24 and/or printer 28 are not powered on when the revised documents are sent, the documents will automatically print when the mobile signing unit 24 and printer 28 are turned on. More specifically, the documents may be held in a queue until the printer is available, such as when the van is out of wireless range. Alternatively, if the mobile signing unit 24 includes a computer 32, the signing officer can use the computer 32 to access the corporate network 36 remotely, and if authorized, make any necessary changes to the signing documents, and re-print the corrected documents. In addition, if changes to the documents require new documents from the lender, the escrow officer and/or the signing officer can coordinate with the lender to receive and print the revised documents in the mobile signing unit 24.

To ensure maximum confidentiality, personal or other sensitive information, is not stored at the mobile signing unit 24. All electronic copies of the signing documents are stored on a server 88 or workstation 92 at the office and all modifications are made on such workstation 92 or server 88. The signing officer or operator may remotely log into a server 88 located at the office, using any known security system or method, including encrypted connections over a password protected portal. Signed documents are scanned and electronically transmitted to the server 88. The physical documents are promptly shipped back to the office overnight, with no copies retained in the mobile signing unit 24. Any checks received in the mobile signing unit 24 are scanned and electronically deposited into the company's escrow account. Once scanned, the checks are promptly shipped back to the office overnight and can no longer be presented at another bank. Therefore, if any devices that make up the mobile signing unit 24 are ever stolen from the housing 20, there will be no sensitive data present. However, if the housing 20 includes the optional secure storage, any sensitive items may be stored in this area until being dropped off or shipped back to the office.

As part of the signing process, the signing officer or operator will verify the identity of each of the signatories to the signing transaction. The documents used in verification are typically saved by photocopying or scanning, such as with the multi-function printer 28, or a stand-alone unit and not included as part of the mobile signing unit 24 per se but included in the housing 20 of the mobile signing unit 24 or otherwise located at the remote site.

The final documents for the transaction are then signed by the appropriate parties to the transaction [424]. The signing officer or operator will need to review the documents to ensure that all necessary signatures are obtained.

The signing officer, operator, or the escrow officer must confirm receipt of applicable funds. Funds may be received from the buyer, the seller, lenders, agents, and other interested parties. Once funds are verified, the signing officer can distribute the checks that were printed as part of the documents. This process may require, for example, using the computer 32 included in the mobile signing unit 24 to access the server 88 at the office, making a secure request to print checks, and designating that the checks are to be printed to the printer 28 in the mobile signing unit 24. If there were no changes to the documents, the checks may have previously been printed with the documents.

The signing officer at the mobile signing unit 24 will confirm that the indicated funds have been received from the lender. The escrow officer or signing officer may optionally transmit the documents to a lender to obtain a funding number as confirmation of funding. If funds are provided to the signing officer at the mobile signing unit 24 during a signing, the received checks can be scanned directly into a designated escrow bank account via a check scanner 80 provided by a bank. Once the funds at issue are verified, they are distributed to the applicable parties to the transaction [430]. Funds may also be sent electronically to participants in the transaction who are not physically present at the signing.

The signed signing documents along with any other documents pertaining to the transaction, such as checks distributed to, or provided by, one or more parties, are scanned from the remote mobile signing unit 24 back to the corporate network 36 [434]. The scanning may be performed by the multi-function printer 28 or a separate scanning device included in the mobile signing unit 24. The physical copy of the documents are shipped overnight to the office and/or the lender.

The signing officer at the mobile signing unit 24 copies the executed signing documents and distributes them as appropriate to the parties involved in the signing transaction [438]. The copies may be in electronic or paper format. The lender documents will likely be sent via overnight mail to the lender; the remaining documents are sent via overnight mail to the office [440].

Once this transaction is completed, the signing officer can transport the mobile signing unit 24 to another location, and conduct another transaction [442].

A quality control step is also performed post-signing at the office to ensure that the signing documents are accurate and complete. Any checks distributed during signing are verified, and a corresponding report is transmitted to the bank. This step may be performed on the next business day after a signing occurs, especially for signings being held after normal business hours [446]. No check presented for payment will be honored by a financial institution 60 unless information pertaining to such check has been transmitted to the company's bank (this is also referred to as "positive pay").

The modular design of the mobile signing unit 24 allows for comparable components to be substituted for the components described herein. This flexibility is ideal for equipment upgrades as technology evolves, and to quickly and easily replace malfunctioning system components.

The processing of a re-finance transaction according to systems and methods consistent with this invention is similar to that of a purchase transaction. The primary difference is that re-finance transactions are unlikely to require the company to issue checks at the signing, so associated processing is not necessary. Additionally, re-finance transactions allow for a three-day right of rescission, whereas purchase transactions do not allow any right of rescission. Thus, the final confirmation of funds and report to the bank pursuant to re-finance transactions occur after the signing.

The above method may be modified as described below to accommodate increased security measures, improve quality control of the process and documents, and increase efficiency of a transaction, particularly when dealing with multiple transactions. As stated above, most signings require a notary to gather identification of the signers and witness and notarize their signatures. The notary also receives information in the closing documents that include personal and confidential information. Much of the information a notary receives could be used in identity theft. Therefore, the method of the present invention and equipment used allows increased security and reduces risk of identity theft for the parties involved in the transaction. The present invention is also configured to allow a mobile operator to operate with the enhanced security protocols, described below, remotely from a physical office, in particular a home or satellite office (referred to in this application generally as corporate) where the bulk of the processing steps not relating to signing the transaction take place contemporaneously with the mobile signing.

The present invention specifically allows for transactions that may occur in areas significantly remote from office locations, even in other states from any physical office locations. As such, the present invention reduces the cost of maintaining physical offices in each community served by a mobile unit operator or mobile operator and provides more flexibility for the company to reallocate resources not only on a daily basis, but also a long term basis. For example, if a certain area of the country or of a state is experiencing an economic slowdown and therefore a decrease in the number of transactions, the housings 20, such as mobile vehicles forming a mobile unit 24, may be easily redeployed without breaking expensive leases on physical buildings. Such redeployment may also allow for increases in activities in other areas with shifts of the mobile units to locations as needed and the mobile units 24 described in this invention may be easily acquired and deployed in a matter of days if needed. For example, a vehicle may be acquired and turned into a mobile unit 24 in a matter of days and sent to the desired location. A vehicle may also be converted into a mobile unit 24 remote from corporate to reduce transit costs.

As described above, one of the first steps is to acquire a vehicle that may be converted to a mobile unit 24. The mobile unit 24 will include the electronics and devices that allow for a secure wireless connection with corporate, allow for printing of the documents, allow for scanning of the documents, and also, if desired, allow for facilitation of electronic documents signings. The mobile unit 24 may vary in size, shape, and configuration, but at its core allows for and facilitates the secure wireless transfer of electronic documents.

Although not required, it is expected that the mobile unit will include a GPS device. The GPS device may be built into the vehicle, be a separate navigations systems, or be included on the mobile phone. The use of a mobile phone or similar device to act as the GPS helps facilitate the ability of corporate to send new locations and routes to the mobile unit 24 without additional special communication equipment. Use of a mobile phone also allows for easy communication back to corporate from the mobile unit 24, in particular the operator of the mobile unit 24, who is expected to be a public notary in most instances. To simplify rollout and operation of the mobile unit, it is expected that corporate will supply the mobile phone to the operator or the notary or at a minimum require use of a mobile phone with certain minimum specifications. The mobile phone or GPS device may also be capable to relaying back in real-time or very close to real time the location of the mobile unit, as well as any other desired information. Corporate may use logistics and routing software and databases to improve fuel economy and reduce time spent in the mobile vehicle as well as time spent traveling between the various transactions, specifically signing locations. In summary, the routing and logistics software may be configured to coordinate signings as well as best paths between signing locations. Of course requested signing times may require deviations from the routes and schedules suggested by the routing and logistics software.

As described above, unless a mobile unit 24 is being used to facilitate only electronic document signings, it is required for a printer 28 to be included in the mobile unit. The printer 28 is preferably a multifunction printer that includes the ability to print, copy, scan and email documents. The documents will not be faxed to the mobile unit as the quality of documents and speed of printing is poor as well as facsimile systems do not have the desired capabilities. It is important to remember that most transactions will have a large number of pages in the documents required for the transaction. Therefore, not just any multifunction printer will meet the desired efficiency and longevity requirements. The printer 28 will need to be sufficiently fast in copying and printing documents, produce clear copies and have the ability to high speed scan signed documents. The printer 28 must be able to be in electronic communication with a wireless communication device, such as a wireless router. While the printer 28 must be able to print, scan, copy and email (otherwise separate units would need to be provided in the limited available space), it is preferable for the printer to be able to connect over encrypted VPN or similar connection to corporate. It is also desirable for the printer 28 to have hard-drive erasing features and use encrypted data storage to ensure no data is stored on the device long term and any temporary storage of information is not accessible.

As also described above, to facilitate remote transactions, corporate must provide some form of an order entry system to obtain information regarding the transaction, including documents on the corporate network. The order entry system should be secure, such as a secure web page that allows a potential client or existing client to communicate securely with corporate regarding any transactions wherein they need corporate to facilitate the signing, obtain signatures, and deliver the signed documents to a specified location. For example, a client may send orders through a secure website to a server controlled by or in communication with corporate. Corporate will verify the ability to fulfill the orders and ensure that corporate is able to complete the signing request within the date and time parameters specified by the client.

The wireless device or network device, as generally described above, is a device creating a secure and encrypted wireless internet connection. The wireless device is further generally a router in the mobile unit 24 that, when powered on, automatically connects the mobile unit to corporate and creates a secure, encrypted connection over which data is transmitted in the form of print jobs and scanned documents. One benefit of the wireless device is that it may function without any computer or human intervention in the mobile unit and at corporate. More specifically, other than the person at corporate selecting the printer, all of the printing to the mobile unit 24 may be automatic through use of the wireless device. In addition, when the operator of the mobile unit 24 scans a document, it may be set to automatically be routed to a location and/or person at corporate for review. This automatic routing and push capabilities of the systems increases security by limiting potential destinations for the documents and saves time for the mobile operator and personnel at corporate.

Another advantage to the wireless device is that it can be configured to broadcast a secure and encrypted Wi-Fi signal to allow connectivity a certain distance from the vehicle. Therefore, if the operator of the mobile unit is at a signing of documents, such as an electronic signing of documents, the mobile operator may take a computer or other device into the signing and many times be connected to corporate through the mobile unit 24.

The wireless device may also include access to the internet in general. More specifically, the internet device is hardware that establishes the internet connection allowing the vehicle access to the world-wide-web. It is important that the system uses a static IP internet address for all connections. The static IP internet address allows for faster remote access to the equipment to troubleshoot and allows a more secure and stable connection to the corporate office.

The wireless device further includes an antenna, preferably a dual high-gain antenna designed to provide steady internet connectivity.

The vehicle as the housing 20 may include a standard power inverter and battery sufficient to power the wireless device and printer 28 even after the motor of the vehicle is turned off. Of course, it is expected that this system will be preferable to be upgraded to a higher wattage system and have additional battery supplies to power all of the mobile unit devices, as the power inverter and battery must provide a stable and steady power source for the equipment to avoid malfunctions of the electronic equipment. To ensure document and identity security, the mobile unit 24 will include a shredder, preferably a cross cut shredder that is capable of complying with any required document destruction restrictions. Any documents not provided to the client at the signing, or overnighted to corporate or the client, are shredded onsite. Shredding extra documents, such as duplicates or documents with errors ensures that the security of the documents are maintained and that such documents to not accidently become mixed with the next documents.

For certain types of transactions, such as electronic document signings, the mobile unit may include a computer, such as a notebook, netbook or tablet which allows for electronic signing and has the ability to independently connect to the world-wide-web or connect to the mobile unit through a secure wireless signal to establish a secure connection. In addition to allowing for certain electronic document signings, the computer may be a back-up to the primary system and allows documents to be opened and printed directly to the printer in the vehicle. Of course, the computer is expected to be configured to have an encrypted hard drive and preferably not store any documents relating to transactions locally. It is always preferred to store the documents at corporate or a location directed by corporate and not locally within the mobile unit. Any computer utilized in the mobile closing unit would include a password-protected and encrypted hard-drive that locks the computer before any operating system is initialized.

While the above description focused on the items in the housing and in particular the mobile unit and variations thereof, the following describes the method along with some optional steps of a paper based signing for a particular transaction in addition to or in connection with the above method steps. The transaction will be described as both parties being at the same location, but with some variation, the mobile unit could easily complete separate signings and travel between the parties as needed to complete the transaction.

The first method steps are generally applicable to both paper based signings and electronic document signings, which are described in greater detail below.

A client or potential client enters an order in an order entry system. For example, the order entry system could be web based and the client enters the order directly or they could call corporate and have the order entered for them over the telephone. The order entry system may include various prompts such as type of service requested, requested transaction date, property address, signing or transaction address, contact info including e-mail address and payment info. As part of the order entry, the client may upload relevant documents to the system or identify form documents held by corporate on behalf of the client. The documents could also be provided to corporate through fax, e-mail, ftp protocol or any other method. Of course the documents could be provided to corporate at the time of order entry or any time thereafter. Corporate will confirm with the parties the signing or transaction date and times and confirm any schedules and places of appointment.

With the order entered, corporate will prepare the documents or review documents that were finalized by the client and then uploaded into the system. As part of the order entry, the client may provide special instructions to corporate or call a representative of corporate for assistance. As part of the process, corporate will prepare any ancillary tasks related to the proposed transaction and prepare any additional documents required. Of course the documents may change between the entry into the corporate system and the document lock time as described below. After all of the final documents are prepared, and on or before the transaction or signing date selected by the client, corporate will provide instructions to the operator of the mobile unit relating to the transaction. As described above, the operator is preferably a public notary. The instructions may be for the next transaction, or a proposed daily agenda of transactions.

Before the first transaction, the mobile unit operator will power up the systems in the housing 20 that form part of the mobile unit 24. Powering up the systems in mobile unit may be as simple as starting the vehicle upon which the systems would automatically power up or having a separate power switch which may allow more control over the power of the systems. The separate power switch may be preferable as it would allow the operator to also control power to the systems when the vehicle is not running, as described above, and in certain cold climates where it is desirable to limit load on the electrical system until the engine warms up.

Upon being powered on, the systems in the mobile unit 24 will contact corporate and make a secure wireless connection. Upon receiving the address of the first signing location, the operator of the mobile unit will direct the mobile unit to the signing location. With the systems in the mobile unit in secure wireless communication with corporate, corporate can send documents directly to the printer in the mobile unit. To prevent errors, immediately prior to the scheduled signing time, the subsequent transaction is "locked" on the website, prohibiting changes to the documents. For example, this lock feature could automatically occur as part of the step of printing the documents to the printer in the vehicle, such as that once the documents for the next transaction are printed to the mobile unit, the documents are automatically locked. The automatic lock feature ensures that the documents are correct for the desired signing. For certain transactions, the documents may be locked by the parties after agreeing on the final documents. For example, two parties may submit the final agreement to corporate and then agree to lock the documents so that there are no surprise changes at the signing of the transaction. After the documents are locked, any changes to documents must be emailed or communicated to corporate. If there are any changes, corporate may unlock the documents and fix the documents and send a new set of documents directly to the printer in the mobile unit 24 and relock the documents. Of course after making any edits, corporate may follow a client's instructions relating to the process for obtaining approval for any changes and then locking the documents upon receiving instructions to lock the documents.

Of course, if documents are not prepared, or it is desirable to allow for as long as period as possible for any edits, the documents may not be printed until the vehicle is confirmed to be at the desired signing location. Upon arriving at the signing location, the mobile unit operator will park the mobile unit in a safe location without obstructing other vehicles or traffic and follow all appropriate traffic laws and regulations.

When the documents are finished printing, the mobile unit may verify manually or automatically with corporate that there were no errors. This step may simply be the printer automatically verifying that the number of pages sent are the same as the number of pages printed and that there were no printing errors or may also include the step of the operator of the mobile checking each page of the document and then verifying with corporate that each page is correct. After verifying that the document package for a particular transaction is correct and organizing it as needed for the transaction, the operator of the mobile unit will exit the mobile unit and lock the mobile unit. In most circumstances it is believed that the mobile operator will leave the equipment in the mobile unit powered on to avoid power-up and connection delays after signing, such as the printer and wireless systems establishing a VPN or other secure link with corporate. Of course, if the operator of the mobile unit believes that the transaction will take a long time, the operator may power down the systems before leaving the mobile unit to avoid battery drain or wasted fuel if the engine is left running on the mobile unit.

When the operator of the mobile unit leaves the unit, the documents should be neatly stacked and clipped together into documents for the individuals that will be signing to avoid any delays processing the signing of the transaction and to minimize the time required for parties to the transactions. The operator of the mobile unit will greet the signors with an appropriate introduction while presenting the proper credentials and verification of identity to the parties to the transaction. The operator of the mobile unit will also verify the identity of the various signers prior to conducting the signing and obtain proof of such identity and include it in the returned document package.

The signing will be conducted in accordance with corporate's procedures for the type of transaction and of course in accordance with any client instructions, applicable law, regulations or industry standards. If the mobile operator is a certified public notary or holds a similar position depending upon local laws and regulations, the operator will if necessary witness the signing of the documents and notarize them. If the operator of the mobile unit is not a public notary, and the transaction requires a mobile operator, corporate will arrange for a mobile operator to witness the signatures at the transaction; however, to ensure security of the documents, the documents will remain in control of the operator, not the notary.

After the documents are signed, the operator will process the signed documents in the mobile unit. During such step of processing the documents, the operator may first scan the signed documents to corporate for quality control review and approval, if required. While waiting for final approval or after final approval by corporate, the operator will make any desired or necessary copies of the signed documents for the signers. For security reasons, the operator of the mobile unit should not leave the mobile unit until all the documents having been transferred to corporate. These systems may be automatically configured to confirm that the number of pages received by corporate for quality control were the same as the number printed to the mobile unit. Of course, the operator could also contact corporate to verify the same and receive final approval. Either while corporate conducts an immediate quality control of the documents or afterward, the operator of the mobile unit will return to the signers and present a copy of the documents. If the final documents were provided to the signers before final approval was received from corporate, then the operator of the mobile unit should not leave the signing location until corporate calls to confirm there were no problems and approves the documents. As discussed above, the final overnight packages or mail packages to corporate are printed in the mobile unit and any documents not sent directly to corporate in hard copy are shredded onsite. As part of sending the signed documents to corporate, the originals are placed in an overnight package and the operator of the mobile unit will place the overnight package in the nearest overnight drop box. The routing and scheduling systems discussed above may also be configured to route the operator of the mobile vehicle past a overnight drop box on the way to the next transaction signing. Of course depending on scheduling and locations of overnight drop boxes, this could vary and multiple transaction signing documents in individual packets may be dropped off at the same time or in the same packet if they are being returned to corporate. The routing and scheduling software may also know the pick-up times at various overnight drop boxes and therefore may ensure routing of the vehicle past a box with a pick-up time after the package is dropped into the box as well as making sure later afternoon packages are placed in overnight drop boxes that will be picked up so corporate will have the documents as soon as possible without wasting time sitting in overnight drop boxes.

As part of the routing to the next transaction, the GPS system or device, in coordination with the routing and scheduling software, allows changes to the schedule to be electronically delivered. The logistics and routing software that is connected to the GPS devices in the vehicles is expected to allow real-time routing, scheduling, and tracking. This software will interface with the daily schedule for each vehicle and will accommodate last-minute additions, deletions and other changes. Another benefit of the real time tracking is that on the day of the scheduled signing, corporate may provide each client and the signers with a link that will allow them to track in real-time the geographical location of the mobile unit assigned to conduct the signing. As such, these systems allow for real-time information updates, such as corporate sending an email or text update to the client upon the following events: (a) the mobile unit arriving at the transaction location; (b) the signing being complete and documents are being reviewed by corporate's quality control department; and (c) that the documents are approved and will be sent to them electronically and that the originals will be sent via overnight courier and include the tracking number on the overnight package(s).

After finishing one transaction, the operator of the mobile unit moves the mobile unit to the next scheduled location and then repeats the above steps for a paper signing, or the following steps for an electronic signing.

For a transaction using electronic signatures, the steps are predominately the same as a paper signing, except as identified below as required changes or optional changes. After equipment is powered on, instead of sending paper documents to a printer, corporate will send the operator or mobile operator a secure link to open the documents electronically, or electronic documents. These may be sent to any electronic device capable of receiving an electronic signature, such as a smart phone, computer, notebook computer, netbook computer, tablet or any future devices. The documents may be sent automatically to the electronic device, or the operator of the mobile unit will connect the electronic device to the internet using the VPN or other secure network in the mobile unit. Of course, the operator may use the above described encrypted Wi-Fi signal that may be broadcast from the mobile unit. Once the electronic documents are received or the link having the electronic documents are opened, the operator may present the electronic documents to the signers and obtain digital signatures, of course after all necessary greeting and verification steps described above in relation to a paper signing are completed. The digital signatures on the electronic documents in some transactions may require the use of a stylus and screen that captures the actual signature electronically in lieu of a typeset signature that complies with the Electronic Signature Act and all applicable client requirements. If the operator of the mobile unit has a Wi-Fi signal available at the signing location that is being broadcast from the mobile unit, the operator may immediately send the documents back to corporate for approval. Otherwise the operator may need to return to the mobile unit or in the vicinity of the mobile unit to obtain a signal for the VPN or other secure connection to contact and provide the documents to corporate if the signing occurred out of range of the mobile unit.

The operator would not proceed to the next transaction until the documents have been sent to corporate. Corporate will then confirm receipt of the documents and finalize the quality control and approve the final electronically signed documents. At that time, corporate may directly provide electronic copies of the signed documents as provided in the order entry system by the client, or if the signers request in person or during the order entry phase, a hard copy of the signed documents. If the hard copy of the documents were requested during the order entry phase, corporate may immediately send the documents to the printer in the mobile unit after approval. The operator will then present the hard copy of the signed documents to the signers (if applicable). Of course, the operator would not leave the location until instructed by corporate or receiving approval from corporate that there were no problems. If hard copies were printed, any documents not overnighted to corporate or the client are shredded onsite. The mobile unit will then proceed to the next transaction location and conduct the transactions as described above. To protect security of the documents, after a signing is complete it is preferable that the electronic device, even if the memory is encrypted, erase the documents from the electronic device, thereby removing any copies from the mobile unit and leaving only the electronic copies in existence at corporate.

In the event any document in the electronic documents requires a traditional "wet" signature, the mobile operator must follow the paper signing procedures set forth above for such documents. For example, all but one or two documents could be electronically signed, and the documents not electronically signed would generally follow the paper signing procedures above, or a mix of the two method steps described herein.

While this invention has been described with respect to a particular embodiment, many modifications and variations of the invention are possible in light of the above teachings. The illustrations and descriptions provided herein are considered to be exemplary and not restrictive in character, it being understood that only illustrative embodiments have been shown and described and that all changes and modifications that come within the spirit of the disclosure are desired to be protected. The invention may therefore be practiced otherwise than as specifically described while within the scope of the appended claims.

What is claimed is:

1. A method of operating a mobile system for processing secure in-person transactions, including a transaction at a transaction location remote from a home office having an office network, using a mobile unit including a printer, scanner, a power source and a network device for communicating with said home office over a wide area network, said method comprising the steps of:
providing power from the power source to the printer and the network device each disposed in the mobile unit;
automatically connecting the network device disposed in the mobile unit to the wide area network upon completing said step of providing power from the power source;
automatically establishing a secure connection between the home office network and the mobile unit upon completing said step of automatically connecting said network device disposed in the mobile unit to the wide area network;
traveling to the transaction location with the mobile unit;
automatically printing a set of prepared documents to create printed documents while performing said step of traveling to the transaction location;
arriving at the transaction location and obtaining the printed documents from the printer disposed in the mobile unit;
presenting the printed documents obtained from the printer disposed in the mobile unit to at least one party at the transaction location;
obtaining a signature on the printed documents from the at least one party at the transaction location to create signed documents;
receiving an order requiring in-person signing of documents;
preparing documents at the home office relating to the order;
providing scheduling information to the mobile unit including the transaction location and expected time of signing and providing scheduling information related to at least one subsequent transaction;
wherein said step of preparing documents at the home office includes the step of printing the prepared documents to a queue relating to the printer in the mobile unit and holding the documents in the queue;
wherein said step of printing the prepare documents to a queue further includes the step of providing a transaction date associated with the prepared documents and further including the step of holding the documents in the queue until the transaction date;
wherein said step of holding the documents in the queue further includes the steps of:
verifying the transaction date matches a current date;
verifying at least one of an actual location or an expected location of the mobile unit;
determining based upon said step of verifying at least one of an actual location or an expected location that the mobile unit is likely traveling to the transaction relating to the documents in the queue; and
automatically releasing the documents in the queue based on the location of the mobile unit so that said step of automatically printing a set of prepared documents to create printed documents while performing said step of traveling to the transaction location may be performed.

2. The method of claim 1 further including the steps of:
scanning the signed documents using the scanner disposed in the mobile unit to create scanned electronic signed documents;
automatically sending the scanned electronic signed documents from the mobile unit to the home office network over the established secure connection.

3. The method of claim 2 further including the steps of:
verifying the scanned electronic signed documents by automatically comparing the scanned electronic signed documents to the printed documents; and
sending a verification approval.

4. The method of claim 1 further including the step of automatically sending successful print notice to the home office after said step of automatically printing the set of prepared documents to create printed documents and before said step of presenting the printed documents obtained from the printer disposed in the mobile unit to at least one party at the transaction location.

5. The method of claim 1 further including the step of automatically sending print error to the home office.

6. The method of claim 5 further including the step of automatically notifying an operator of the mobile unit of the print error received in said step of automatically sending print error to the home office and wherein said notification is not provided through the printer disposed in the mobile unit.

7. The method of claim 5 further including the step of automatically notifying an operator of the mobile unit of the print error received in said step of automatically sending print error to the home office and wherein said notification is not provided through a laptop computer disposed in the mobile unit.

8. The method of claim 1 further including the step of locking the documents to prevent changes to the documents before said step of automatically printing a set of prepared documents to create printed documents while performing said step of traveling to the transaction location.

9. The method of claim 8 wherein further including the steps of:
receiving a requested change by one of the parties to the transaction after said step of locking the documents;
notifying each party to the transaction of the requested change;
obtaining approval from each party to the transaction for the requested change;
unlocking the documents to allow changes to the documents; and
automatically notifying an operator of the mobile unit upon performing said step of unlocking the documents to allow changes.

10. The method of claim 9 further including the steps of:
making the requested change to the documents to create changed documents after said step of unlocking the documents;
printing changed documents on the printer in the mobile unit to create printed documents for use in the transaction.

* * * * *